United States Patent
Frankkila et al.

(10) Patent No.: US 11,206,320 B2
(45) Date of Patent: Dec. 21, 2021

(54) METHOD AND APPARATUS FOR IMPLEMENTING CONGESTION CONTROL NEGOTIATION

(71) Applicant: TELEFONAKTIEBOLAGET LM ERICSSON (PUBL), Stockholm (SE)

(72) Inventors: Tomas Frankkila, Fuleå (SE); Zaheduzzaman Sarker, Järfälla (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/084,734

(22) Filed: Oct. 30, 2020

(65) Prior Publication Data

US 2021/0051219 A1 Feb. 18, 2021

Related U.S. Application Data

(62) Division of application No. 15/641,761, filed on Jul. 5, 2017, now Pat. No. 10,848,602.

(Continued)

(51) Int. Cl.
*H04L 29/06* (2006.01)
*H04L 12/825* (2013.01)
*H04L 12/801* (2013.01)

(52) U.S. Cl.
CPC .......... *H04L 69/24* (2013.01); *H04L 47/12* (2013.01); *H04L 47/14* (2013.01); *H04L 47/25* (2013.01);

(Continued)

(58) Field of Classification Search
None
See application file for complete search history.

(56) References Cited

U.S. PATENT DOCUMENTS 7,782,759 B2 * 8/2010 Sridharan ............. H04L 69/163
370/216
8,416,690 B2 * 4/2013 Zhao ....................... H04L 47/12
370/234

(Continued)

OTHER PUBLICATIONS

3GPP TS 22.105 V13.0.0 (Dec. 2015), 3rd Generation Partnership Project; Technical Specification Group Services and System Aspects; Services and service capabilities (Release 13), upload date Dec. 18, 2015, the whole document.

(Continued)

*Primary Examiner* — Lance Leonard Barry

(57) ABSTRACT

A method of configuring a first client device to utilize at least one type of rate adaptation method in a negotiated session with a second client device. The first client determines whether a first type of rate adaptation method and a generic feedback format are to be used in the negotiated session. Upon determining that only the first type of rate adaptation method is to be used, the first client device is configured to utilize the first type of rate adaptation method for both semi-static and dynamic rate adaptation. Upon determining that both are to be used, the first client device is configured to utilize the first type for semi-static rate adaptation, and to utilize for dynamic rate adaptation a preferred rate adaptation method selected from a plurality of rate adaptation method types that provide improved performance for dynamic rate adaptation compared to the first type of rate adaptation method.

10 Claims, 8 Drawing Sheets

Related U.S. Application Data

(60) Provisional application No. 62/359,993, filed on Jul. 8, 2016.

(52) U.S. Cl.
CPC ........ *H04L 47/263* (2013.01); *H04L 65/1069* (2013.01); *H04L 65/1083* (2013.01)

(56) References Cited

U.S. PATENT DOCUMENTS

| | | | |
|---|---|---|---|
| 2012/0087244 | A1 | 4/2012 | Leung |
| 2015/0373577 | A1* | 12/2015 | Yang ................ H04W 72/0413 455/435.1 |
| 2017/0289041 | A1* | 10/2017 | Li ........................... H04L 69/16 |
| 2017/0310593 | A1* | 10/2017 | Kong ..................... H04L 69/16 |

OTHER PUBLICATIONS

3GPP TS 26.114 V14.0.0 (Jun. 2016), 3rd Generation Partnership Project; Technical Specification Group Services and System Aspects; IP Multimedia Subsystem (IMS); Multimedia Telephony; Media handling and interaction (Release 14), upload date Jun. 24, 2016, the whole document.
J. Rosenberg et al., "SIP: Session Initiation Protocol", Network Working Group, Request for Comments: 3261, Jun. 2002, 252 pages.
J. Rosenberg et al., "An Offer/Answer Model with the Session Description Protocol (SDP)", Network Working Group, Request for Comments: 3264, Jun. 2002, 25 pages.
Schulzrinne H., et al.: "RTP: A Transport Protocol for Real-Time Applications", RFC 3550, Network Working Group, Internet Society, Jul. 1, 2003 (Jul. 1, 2003), 104 pages.
M. Handley et al., "SDP: Session Description Protocol", Network Working Group, Request for Comments: 4566, Jul. 2006, 46 pages.
J. Ott et al., "Extended RTP Profile for Real-time Transport Control Protocol (RTCP)-Based Feedback (RTP/AVPF)", Network Working Group, Request for Comments: 4585, Jul. 2006, 48 pages.
S. Wenger et al., "Codec Control Messages in the RTP Audio-Visual Profile with Feedback (AVPF)", Network Working Group, Request for Comments: 5104, Feb. 2008, 60 pages.
V. Singh, Ed. et al., "RTP Control Protocol (RTCP) Extended Report (XR) Block for the Bytes Discarded Metric", Internet Engineering Task Force (IETF), ISSN: 2070-1721, Request for Comments: 7243, May 2014, 12 pages.
R. Jesup et al., "Congestion Control Requirements for Interactive Real-Time Media draft-ietf-rmcat-cc-requirements-09", Network Working Group, Internet-Draft, Dec. 12, 2014, 12 pages.
WebRTC overview, accessed at the link http://www.webrtc.org/ on Jul. 27, 2017, 1 page.
Johansson I., Sarker Z., "Self-Clocked Rate Adaptation for Multimedia; draft-ietf-rmcat-scream-cc-05", Internet Engineering Task Force, IETF; Standard Working Draft, Internet, Jun. 27, 2016 (Jun. 27, 2016), 35 pages.
S. Holmer et al., "A Google Congestion Control Algorithm for Real-Time Communication draft-ietf-rmcat-gcc-01", Network Working Group, Internet-Draft, Oct. 19, 2015, 18 pages.
Zhu X., et al., "NADA: A Unified Congestion Control Scheme for Real-Time Media; draft-ietf-rmcat-nada-02", Internet Engineering Task Force, IETF; Standard Working Draft, Internet Society, Mar. 18, 2016 (Mar. 18, 2016), 25 pages.
Holmer S., et al., "RTP Extensions for Transport-wide Congestion Control draft-holmer-rmcat-transport-wide-cc-extensions-01", Internet Engineering Task Force, IETF; Standard Working Draft, Internet Society, Oct. 19, 2015 (Oct. 19, 2015), 11 pages.
Lundin et al., "A Google Congestion Control Algorithm for Real-Time Communication; draft-alvestrand-rmcat-congestion-02", Internet Engineering Task Force, IETF; Standard Working Draft, Internet Society, Feb. 14, 2014, 19 pages.

\* cited by examiner

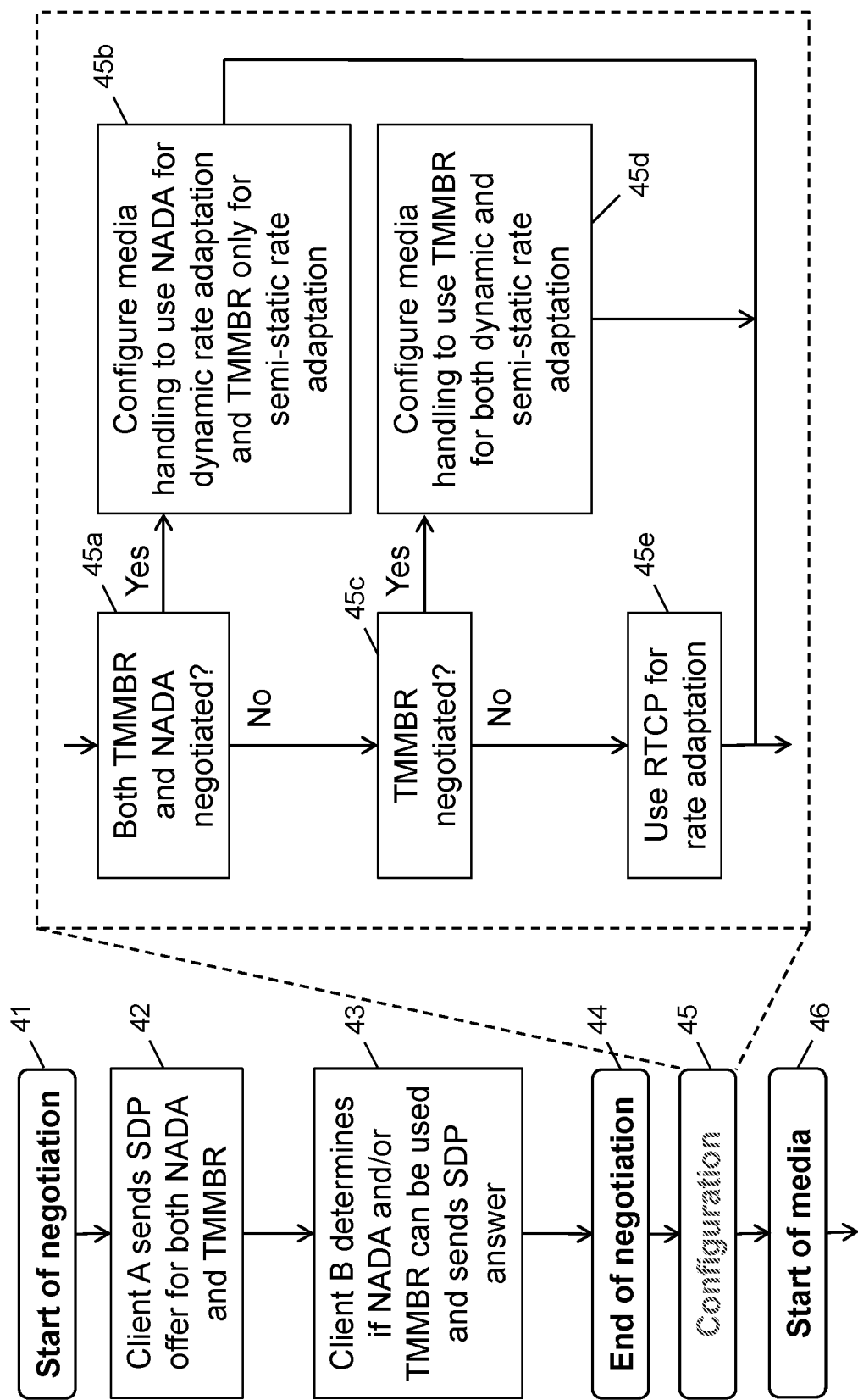

METHOD AND APPARATUS FOR IMPLEMENTING CONGESTION CONTROL NEGOTIATION

CROSS-REFERENCE TO RELATED APPLICATIONS

This application is a division of U.S. application Ser. No. 15/641,761, filed Jul. 5, 2017, which claims the priority benefit under 35 U.S.C. § 119(e) of U.S. Provisional Application No. 62/359,993 filed on Jul. 8, 2016, the disclosures of which are incorporated herein by reference in its entirety.

TECHNICAL FIELD

The present disclosure relates generally to data processing systems. More particularly, the present disclosure relates to networked data processing systems. Still more particularly, the present disclosure is directed to a method and apparatus that improves network performance by implementing congestion control negotiation in a data processing network.

BACKGROUND

Generally, congestion occurs in networks or nodes in a network when more data is received in a network or node than the network or node can process and transmit from the network or node without excessive delay or lost data. Congestion typically occurs when too many users attempt to use a limited amount of transmission resources. The end result, from a perspective of one particular user, is that the amount of data that this one particular user can successfully transmit through the network is reduced (e.g., the data throughput is reduced). The congestion may cause a temporary reduction of the throughput or may persist for a longer period of time.

The 3GPP TS 26.114, V.14.0.0 (2016 June) "IP Multimedia Subsystem (IMS); Multimedia telephony; Media handling and interaction" (MTSI) specification uses a Temporary Maximum Media Stream Bit Rate (TMMBR) message to send receiver rate recommendations to the sender of the media regarding the bitrate the receiver is capable of receiving. The TMMBR message is defined in IETF RFC 5104, (2015 October), "Codec Control Messages in the RTP Audio-Visual Profile with Feedback (AVPF)". The bitrate signaled in the TMMBR message does include the IP/UDP/RTP overhead. It is common that clients for video telephony already support TMMBR, which can be used for rate adaptation.

SUMMARY

There is a need to not only reduce congestion in networks, but to ensure that methods used to reduce congestion are adapted to network composition (for example, the types of nodes in the network) and network conditions.

Adopting one or several Real-time Transport Protocol Media Congestion Avoidance Techniques (RMCAT) method(s) for dynamic rate adaptation means that there would be two or more methods for dynamic rate adaptation being used in parallel, as discussed below. Since TMMBR is receiver-based and other methods such as Self-Clocked Rate Adaptation for Multimedia (SCReAM), Google Congestion Control (GCC), and Network-Assisted Dynamic Adaptation (NADA) are sender-based, the decisions on when to increase or decrease the bitrate will be unsynchronized and will, quite likely, be done with different frequencies and intervals. This may result in contradicting rate requests since one method may request that the bitrate be increased while another method requests that the bitrate be reduced. This may also result in oscillating behavior where one method determines at a certain time that the bitrate needs to be decreased, and another algorithm a while later determines that the algorithm needs to be increased, and then the first algorithm again determines that the bitrate needs to be decreased, and so on.

Such oscillating behavior is undesirable for several reasons, for example (but not necessarily limited to): (1) the quality of the media may vary a lot over time, reducing the user's Quality of Experience (QoE); (2) the generated media may vary a lot over time, causing buffering in transmitters, routers, and other network nodes. This then results in packet delays, packet losses, and/or late losses; and (3) the oscillating bitrate causes problems for the radio access since the used bitrate becomes less predictable. This gives problems for the admission control, policing (rate shaping) and scheduling.

It is foreseen that the method(s) developed by RMCAT will have better performance than can be achieved with TMMBR. One of the reasons for this is that TMMBR messages are used with a relatively small RTCP bandwidth, so the frequency with which TMMBR messages can be sent is relatively small. The RMCAT method(s) will likely use a larger RTP Control Protocol (RTCP) bandwidth and more frequent feedback signaling. Another reason is that sender-based adaptation should be better when there are several media streams of the same type and/or priority. In such cases, the sender can decide how much of the total bitrate should be used for each media stream since the sender can take the priorities of each stream into account, especially when the priorities may change over time. The receiver does not have this information, and thus receiver-based adaptation cannot take varying priorities into account. Yet another reason is that video encoders use variable bitrate encoding where the used bitrate depends on the content that is being encoded. If there are only small changes in the video, the encoder is expected to generate fewer bits than if there are large changes. When there are several video streams, sender-based adaptation may use this property to adjust the portion of the total bitrate that is used for each respective stream. The receiver does not know when and how the videos change, so it cannot take this into account.

For TMMBR, the feedback signaling is specific for the stream. Thus, the media receiver needs to determine which bitrate to use for each stream. It is not possible to send a request for the aggregate bitrate (the sum of bitrates for the streams).

To avoid problems caused by having multiple methods for dynamic rate adaptation working in parallel, the solution disclosed herein is to configure the clients to use different methods for rate adaptation differently depending on the outcome of the session setup negotiation.

If only TMMBR is negotiated for the session, the client is configured to use TMMBR for both dynamic rate adaptation and for semi-static rate adaptation.

If both TMMBR and an alternative method for rate adaptation is negotiated, e.g. either of SCReAM, GCC, or NADA, then the client is configured to use SCReAM/GCC/NADA for dynamic rate adaptation and to use TMMBR only for semi-static rate adaptation. If a specific method for rate adaptation is negotiated then both clients should use the same method, for example SCReAM.

If both TMMBR and the generic feedback format (e.g., Transport-Wide Congestion Control (TWCC)) are negotiated then the client is configured to use SCReAM, GCC, or NADA for dynamic rate adaptation, whichever it prefers, and to use TMMBR only for semi-static rate adaptation. In this case, it can happen that different clients use different methods for rate adaptation, for example one client may use SCReAM while the other client may use GCC.

Thus, the disclosed method and apparatus configures a plurality of clients to utilize different methods for rate adaptation differently depending on an outcome of a session setup negotiation. A client is configured to utilize a first rate adaptation for both dynamic rate adaptation and for semi-static rate adaptation, if only the first rate adaptation is negotiated for the session. If both a first rate adaptation and a second rate adaptation is negotiated, then the client is configured to use the second rate adaptation for dynamic rate adaptation and the first rate adaptation for semi-static rate adaptation. If a specific rate adaptation is negotiated, then a client and a second client should use the specific rate adaptation. If both a first rate adaptation and a third rate adaptation, wherein the third rate adaptation is a generic feedback format, are negotiated, then the client is configured to use a second rate adaptation for dynamic rate adaptation and to use the first rate adaptation for semi-static rate adaptation.

In one embodiment, the present disclosure is directed to a method of configuring a first client device to utilize at least one type of rate adaptation method in a session with a second client device. The method includes determining by the first client device, whether at least one first type of rate adaptation method and at least one second type of rate adaptation method are to be used in the session, wherein the at least one first type of rate adaptation method is usable for both semi-static rate adaptation and dynamic rate adaptation, and the at least one second type of rate adaptation method provides improved performance for dynamic rate adaptation compared to the first type of rate adaptation method. Upon determining that only the at least one first type of rate adaptation is to be used in the session, the first client device is configured to utilize the at least one first type of rate adaptation method for both semi-static rate adaptation and for dynamic rate adaptation, and upon determining that both the at least one first type of rate adaptation method and the at least one second type of rate adaptation method are to be used in the session, the first client device is configured to utilize the first rate adaptation method for semi-static rate adaptation and to utilize the second rate adaptation method for dynamic rate adaptation.

In another embodiment, the present disclosure is directed to an apparatus in a first client device for configuring the first client device to utilize at least one type of rate adaptation method in a session with a second client device. The apparatus includes a processor and a non-transitory memory for storing instructions executable by the processor, the instructions including session-establishment instructions and device-configuration instructions. When the first client device initiates establishment of a session with the second client device, the processor is configured to execute the instructions in the memory, thereby causing the processor to determine whether at least one first type of rate adaptation method and at least one second type of rate adaptation method are to be used in the session, wherein the at least one first type of rate adaptation method is usable for both semi-static rate adaptation and dynamic rate adaptation, and the at least one second type of rate adaptation method provides improved performance for dynamic rate adaptation compared to the first type of rate adaptation method. Upon determining that only the at least one first type of rate adaptation is to be used in the session, the processor configures the first client device to utilize the at least one first type of rate adaptation method for both semi-static rate adaptation and for dynamic rate adaptation. Upon determining that both the at least one first type of rate adaptation method and the at least one second type of rate adaptation method are to be used in the session, the processor configures the first client device to utilize the first rate adaptation method for semi-static rate adaptation and to utilize the second rate adaptation method for dynamic rate adaptation.

In another embodiment, the present disclosure is directed to a method of configuring a first client device to utilize at least one type of rate adaptation method in a session with a second client device. The method includes determining whether a first type of rate adaptation method usable for both semi-static rate adaptation and dynamic rate adaptation, a generic feedback format, or both the first type of rate adaptation method and the generic feedback format are to be used in the negotiated session. Upon determining that only the first type of rate adaptation method is to be used in the session, the first client device is configured to utilize the first type of rate adaptation method for both semi-static rate adaptation and for dynamic rate adaptation. Upon determining that both the first type of rate adaptation method and the generic feedback format are to be used in the session, the first client device is configured to utilize the first type of rate adaptation method for semi-static rate adaptation, and to utilize for dynamic rate adaptation, a preferred rate adaptation method selected from a plurality of rate adaptation method types that provide improved performance for dynamic rate adaptation compared to the first type of rate adaptation method.

In another embodiment, the present disclosure is directed to an apparatus in a first client device for configuring the first client device to utilize at least one type of rate adaptation method in a session with a second client device. The apparatus includes a processor and a non-transitory memory for storing instructions executable by the processor, the instructions including session-establishment instructions and device-configuration instructions. When the first client device initiates establishment of a session with the second client device, the processor is configured to execute the instructions in the memory, thereby causing the processor to determine whether a first type of rate adaptation method usable for both semi-static rate adaptation and dynamic rate adaptation, a generic feedback format, or both the first type of rate adaptation method and the generic feedback format are to be used in the negotiated session. Upon determining that only the first type of rate adaptation method is to be used in the session, the processor configures the first client device to utilize the first type of rate adaptation method for both semi-static rate adaptation and for dynamic rate adaptation. Upon determining that both the first type of rate adaptation method and the generic feedback format are to be used in the session, the processor configures the first client device to utilize the first type of rate adaptation method for semi-static rate adaptation, and to utilize for dynamic rate adaptation, a preferred type of rate adaptation method selected from a plurality of rate adaptation method types that provide improved performance for dynamic rate adaptation compared to the first type of rate adaptation method.

Advantages of the disclosed method and apparatus include avoidance of problems with contradicting rate requests and avoidance of problems caused by oscillating bitrates. The improved rate adaptation offered with the SCReAM/GCC/NADA solutions disclosed herein may be utilized whenever possible while still keeping full backwards compatibility with legacy clients.

Further features and benefits of embodiments of the present disclosure will become apparent from the detailed description below.

BRIEF DESCRIPTION OF THE DRAWINGS

Embodiments of the present disclosure are illustrated by way of example, and not by way of limitation, in the Figures of the accompanying drawings in which like references indicate similar elements.

The accompanying drawings are incorporated into and form a part of the specification to illustrate one or more exemplary embodiments of the present disclosure. Various advantages and features of the disclosure will be understood from the following Detailed Description taken in connection and with reference to the attached drawing Figures in which:

FIG. 2C is a computer flow diagram illustrating a method of negotiation and client configuration for congestion control utilizing NADA according to an another embodiment of the present disclosure;

DETAILED DESCRIPTION

Figure 1:
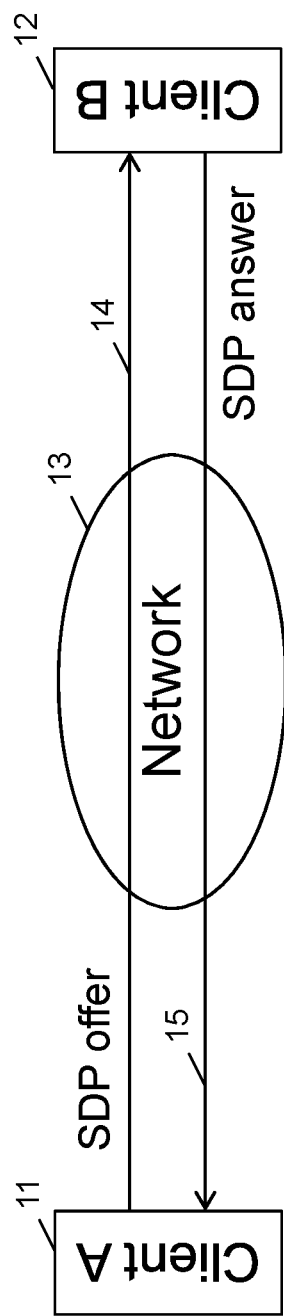
FIG. 1 is a high-level block diagram of a communications network according to an embodiment of the present disclosure.

In the following description, numerous specific details are set forth with respect to one or more embodiments of the present patent disclosure. However, it should be understood that one or more embodiments may be practiced without such specific details. In other instances, well-known circuits, subsystems, components, structures, and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communications, i.e., a communicative relationship, between two or more elements that are coupled with each other. Further, in one or more example embodiments set forth herein, generally speaking, an element, component, or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple network-based functions (e.g., Audio/Visual (NV) media management, session control, Quality of Service (QoS) policy enforcement, bandwidth scheduling management, subscriber/device policy and profile management, content provider priority policy management, streaming policy management, conflict management, and the like), in addition to providing support for multiple application services (e.g., data and multimedia applications). Subscriber end stations or client devices may comprise any device configured to execute, inter alia, a streaming client application (e.g., an Adaptive Bit Rate (ABR) streaming client application) for receiving content from one or more content providers. Accordingly, such client devices may include set-top boxes, Personal Video Recorders/Digital Video Recorders (PVR/DVRs), workstations, laptops, netbooks, palm tops, mobile phones, smartphones, multimedia phones, Voice Over Internet Protocol (VOIP) phones, mobile/wireless user equipment, high definition television terminals, portable media players, gaming systems or consoles (such as the Wii U®, Play Station 4®, Xbox One®), etc., that may access or consume content/services provided over a content delivery network for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to ascribe such feature, structure, or characteristic to other embodiments whether or not explicitly described.

The following list of abbreviations is provided to enhance understanding of the present disclosure:
   3GPP 3rd Generation Partnership Project
   ABR Adaptive Bit Rate
   AMR Adaptive Multi Rate
   AMR-WB Adaptive Multi Rate Wideband
   CC Congestion Control
   CSVT Circuit Switched Video Telephony
   GCC Google Congestion Control
   IETF Internet Engineering Task Force
   IMS IP Multimedia Subsystem
   HSPA High Speed Packet Access
   LTE Long Term Evolution
   MGW Media Gateway
   MTSI Multimedia Telephony Service for IMS
   NADA Network-Assisted Dynamic Adaptation
   RAT Radio Access Technology
   RMCAT RTP Media Congestion Avoidance Techniques
   RTP Real-time Transport Protocol
   RTCP RTP Control Protocol
   SCReAM Self-Clocked Rate Adaptation for Multimedia
   SDP Session Description Protocol
   SIP Session Initiation Protocol
   TMMBR Temporary Maximum Media Stream Bit Rate
   TWCC Transport-Wide Congestion Control
   VoIP Voice over IP
   VToIP Video Telephony over IP
   WebRTC Web Real-Time Communication Congestion, Congestion Control, and Rate Adaptation When describing congestion, it is common to classify it into a few "congestion levels" according to the severity of the congestion, for example, no congestion, slight congestion, medium congestion, and heavy congestion. However, in reality, the congestion level is continuously varying, both in time and in severity.

Congestion has a significant impact on the service and the service quality as perceived by the users. The impacts on the service and the service quality depend on the type of service that is being used.

The way in which the congestion is handled is often referred to as congestion control (or congestion management) and includes detecting the congestion, sometimes also including determining the congestion level, and reducing the congestion level such that the impact on the service and also other services is reduced. Different types of services use different types of congestion control.

Services can, in general, be classified into two types of services: (1) file transfer or (2) conversational.

For (1) file transfer services, the total amount of data that needs to be transmitted is constant, and the objective is to transfer the file as fast as possible. The typical congestion control mechanism is to reduce the number of data packets that are being sent during a given time period, which reduces the load on the network. Congestion and congestion control for file transfer, therefore, extend the time it takes to send the entire file. A well-working congestion control mechanism would still try to minimize the total time it takes for transferring the file.

For (2) conversational services (and streaming services), there are often requirements on the end-to-end delay that need to be fulfilled. For conversational voice telephony, for example, 3GPP has defined both requirements and recommendations for the end-to-end delay in 3GPP TS 22.105, V.13.0.0 (2015 December), "Services and service capabilities". The reason to maintain a short end-to-end delay is that longer delays would significantly impact the possibility of having an efficient conversation. Allowing a longer transmission time when there is congestion is therefore not an option. Instead, the sender has to reduce the amount of data that needs to be transmitted, which is done by reducing the bitrate of the encoding. This is often called rate adaptation, as described in additional detail below.

Rate adaptation is often categorized into two main classes depending on whether the receiver or the sender decides which rate to use:

(1) Receiver-based rate adaptation: The receiver continuously monitors the performance of the received data (e.g., packet loss rate, packet delay, packet jitter, etc.) and determines which bitrate the receiver is capable of receiving. The receiver then sends a rate request back to the sender with the bitrate the receiver wants to receive.

(2) Sender-based rate adaptation: The receiver continuously monitors the performance of the received data (e.g., packet loss rate, packet delay, packet jitter, etc.) and sends performance metrics back to the sender. The sender then decides what bitrate to use when sending.

In some implementations, a combination of receiver-based and sender-based rate adaptation may also be used.

Varying Operating Conditions

The congestion level often varies over time, which means that applications or services using the network will experience this as a variation in the operating conditions. The variations may occur more or less frequently, or even continuously for a portion of the session or even during the entire session. In the present disclosure, the variations are divided into "semi-static variations" and "dynamic variations" depending on their characteristics.

Semi-static variations typically occur relatively rarely, but the variations are typically large and more persistent, e.g., step-wise variations. The operating conditions are then usually relatively stable for a quite long time. A few examples resulting in semi-static variations are handover between different Radio Access Technologies (RATs), session re-negotiation, and change of radio bearer. Handover between different RATs, for example from LTE to HSPA, may mean that the (theoretical) maximum throughput is changed from, e.g., 2 Mbps to 0.5 Mbps, and this limitation may persist for perhaps several minutes or until the end of the session. Session re-negotiation may occur because, for example, a remote end is handed over between RATs and then a session re-negotiation is performed to establish new bandwidth (bitrate) limitations. The network may decide that the bearer should be changed, for example due to high load, which means that the end-points need to reduce their respective sending rate.

Dynamic variations, on the other hand, typically occur quite frequently, e.g., on a per-second or per sub-second basis, but each variation is typically relatively small, for example changing the throughput by as little as perhaps 1-10%. This does not preclude the possibility that dynamic variations can sometimes also be quite large. Dynamic variations may be caused by several factors. For example, a varying number of users using the same transmission resource(s) means that the network load will vary, often quite rapidly. For some services, for example video or web browsing, the amount of data that needs to be transmitted varies quite significantly from frame to frame. If many users happen to send or receive a lot of data at the same time then this can cause temporary congestion somewhere in the path, e.g. in routers or in the radio access. Additionally, the radio conditions may vary depending on how close a user is to the base station and/or depending on the radio interference caused by other users.

There is, however, not a clear distinction between the semi-static variations and the dynamic variations. A receiver will detect the effects of the varying operating conditions, e.g., packet loss or delays, but may not always be able to determine if these were caused by semi-static variations or dynamic variations.

Rate Adaptation Signaling

In a Real-time Transport Protocol (RTP)-based media communication, the basic method of signaling Quality of Service (QoS) metrics about the RTP transmission is an RTCP Sender Report (SR)/Receiver Report (RR). The RTCP SR/RR is defined in RFC3550. A more detailed report on the transmission may be sent from the receiver to the sender using RTCP XR Blocks as described in RFC7243.

As noted above, the Multimedia Telephony Service for IMS (MTSI) specification (TS 26.114) uses a TMMBR message to send receiver rate recommendations to the sender of the media regarding the bitrate the receiver is capable of receiving. The TMMBR message is defined in RFC5104. The bitrate signaled in the TMMBR message does include the IP/UDP/RTP overhead.

The Internet Engineering Task Force (IETF) is discussing congestion control for real-time media in the RTP Media Congestion Avoidance Techniques (RMCAT) working group. It is envisioned that the solution for congestion control defined in RMCAT will be used in Web Real-Time Communication (WebRTC). One of the proposed solutions is the Self-Clocked Rate Adaptation for Multimedia (SCReAM). Two other proposed solutions are Google Congestion Control (GCC) and Network-Assisted Dynamic Adaptation (NADA).

A common property of SCReAM, GCC, and NADA is that they all use sender-based rate adaptation where the media receiver evaluates certain performance metrics and sends these metrics back to the media sender. Which performance metrics are evaluated and signaled depends on the particular solution.

The SCReAM, GCC, and NADA solutions only address dynamic rate adaptation and need some other method for semi-static rate adaptation, for example TMMBR or similar.

Another approach being discussed in RMCAT is to specify a generic feedback format, which all RMCAT candidates could use, but to leave the remaining parts of the algorithms unspecified. One proposal for such a generic feedback format is described in Transport-Wide Congestion Control (TWCC).

Rate Adaptation in the 3GPP MTSI Service

In MTSI, the dynamic rate adaptation is primarily receiver-based. The metrics that the media receiver evaluates are not specified, but the receiver is responsible for estimating the bitrate it can receive and signals this to the media sender using TMMBR. An MTSI client may handover between different access types, for example from Long Term Evolution (LTE) to High Speed Packet Access (HSPA). If a media receiver does such a handover, this may indicate the bitrate of the media needs to be changed. The media receiver uses TMMBR also for such semi-static rate adaptation.

This means that the media sender does not know whether the media receiver wants to change the bitrate because of dynamic variations or semi-static variations. The use of the TMMBR feedback messages is negotiated at session setup and, if agreed, the media sender just receives the request for a certain bitrate and needs to follow it.

In 3GPP/SA4 it has been discussed whether the congestion control method(s) developed in RMCAT should also be adopted for MTSI. If the RMCAT method(s) are adopted for MTSI, there would be some clients (e.g., mobile phones) that support the new method(s) (SCReAM/GCC/NADA) while legacy clients would only support the old method (TMMBR).

Session Setup

When a session is initiated, the clients (and network(s)) need to agree on which media types to use (e.g., both audio and video), which codec(s) to use for each media type, and how the codecs should be configured. This is because, for example, different users may prefer to use only some services, for example one user may want to use both audio and video while the other user want to use only audio; different users may have different types of subscriptions that only allow some media types, certain codecs, and/or codec configurations; and different clients may support different media types and different configurations.

FIG. 1 is a high-level block diagram of how a first client (Client A 11) and a second client (Client B 12) are connected through a network 13, for example a cellular network. In reality, there are often several networks in the path, for example: Client A may use the access network of Operator A; Client B may use the access network of Operator B; and the access networks may be inter-connected directly or via one or more other operator networks.

The clients may be of different types, for example: mobile phones with built-in support for the telephony service; or mobile phones, tablets or personal computers where the user downloads and installs an application for telephony communication, e.g. a VoIP (Voice over IP) or VToIP (Video Telephony over IP) application. It may also happen that either client is a Media Gateway (MGW), which for example is used for interworking between VoLTE and Circuit Switched Video Telephony (CSVT) or for doing transcoding between different codecs.

In this description, the session setup procedure is using the Session Initiation Protocol (SIP) described in RFC3261, but other protocols for session setup may be used. Which media types, codecs, and codec configuration that will be used in the session are negotiated with the Session Description Protocol (SDP) as described in RFC4566 using the SDP Offer/Answer model in RFC3264.

The session setup starts by Client A 11 sending to Client B 12, a SIP INVITE message 14 including an SDP offer, which describes the media types, codecs, and codec configurations that Client A can accept in the session. For example, the SDP offer may show that Client A wants to use both audio and video. Audio may be offered with both Adaptive Multi Rate (AMR) and Adaptive Multi Rate Wideband (AMR-WB), and video may be offered with both the H.264 and H.265 codecs.

The SDP offer may also describe different configuration options for the codecs, including several configuration alternatives for each codec. One example for the AMR and AMR-WB codecs is to use different packetization variants, i.e. the so-called 'bandwidth-efficient' and 'octet-aligned' modes. Another example is that the H.264 codec may be offered with different profiles, for example one configuration with the Baseline Profile and another configuration with the Constrained High Profile.

For the purpose of this description, it is sufficient to understand that most codecs can be configured in several ways and the SDP offer may therefore include multiple media types, multiple codecs for each media type and multiple configurations for each codec.

Networks in the path receive the SDP offer from Client A 11, or from an earlier network in the path, and verify that the offered media types, codecs, and configurations are allowed. Networks may modify the SDP offer by removing undesired combinations. Networks may also add configurations, for example for transcoding and/or re-packetization, in order to increase the chances that the session can be set up even if the clients would only support different codecs and/or configurations.

The final network in the path forwards the SIP INVITE and the SDP offer to Client B 12. If Client B accepts the session setup, then Client B selects which media type(s), codec(s), and configurations(s) Client B accepts for the session. This usually includes asking the user which media type(s) he/she wants to use, e.g., whether the user wants to use both speech and video or only speech. The codecs and configurations to support those media type(s) are typically determined by the clients themselves. The selected media types, codecs, and configurations are included in an SDP answer 15 that Client B sends back to Client A 11. The SDP answer can be sent in several different SIP messages. One possibility is to send the SDP answer in a 200 OK message after the user has accepted the call. Other possibilities exist, but this is not important for this description.

The use of TMMBR is negotiated in the SDP Offer/Answer using the "a=rtcp-fb" attribute as described in RFC4585. For SCReAM, GCC, and NADA, two possible solutions are discussed in RMCAT. One possible solution is to negotiate exactly which rate adaptation algorithm to use. In this case, the SDP mechanisms would need to be defined. Another possible solution is to negotiate a generic format for the feedback messages, which could then be used by any rate adaptation algorithm, e.g., as described in TWCC. In this case, the SDP mechanism would also need to be defined.

When the session has been set up, and the end-points have agreed on what to use in the session, then the media starts, typically in both directions. This also means that the selected adaptation methods become active and remain active until the end of the session.

Negotiation and Client Configuration for Specific Congestion Control

FIGS. 2A-2D are a computer flow diagrams illustrating the steps occurring in the start of the session, including both the session setup negotiation and how the media handling in the client is configured depending on the outcome of the negotiation. The only differences between the flow diagrams in FIGS. 2A-2D is the method for congestion control being used.

Figure 2A:
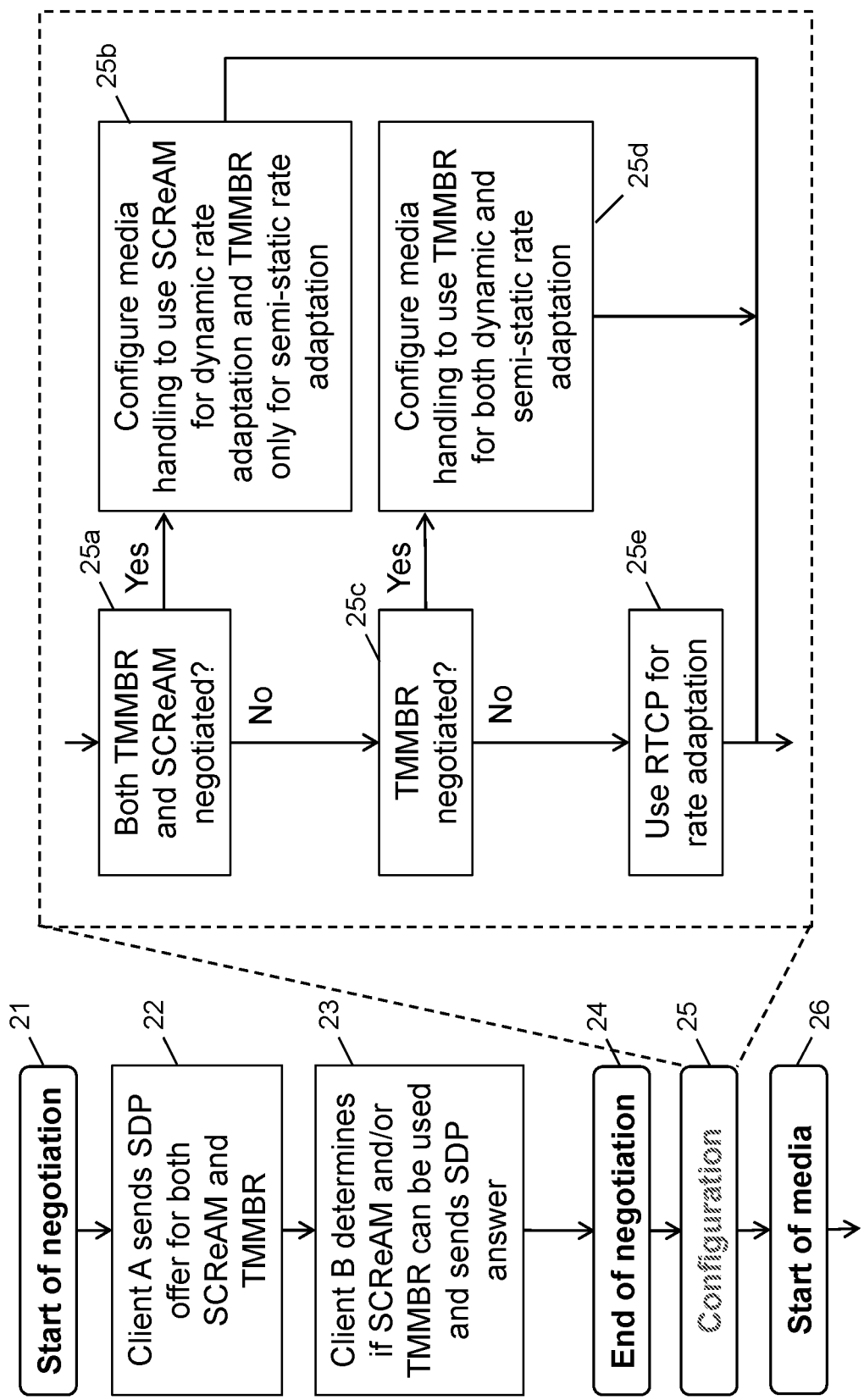
FIG. 2A is a computer flow diagram illustrating a method of negotiation and client configuration for congestion control utilizing SCReAM according to an embodiment of the present disclosure.

FIG. 2A is a computer flow diagram illustrating a method of negotiation and client configuration for SCReAM congestion control according to an embodiment of the present disclosure. Negotiation starts at step 21. At step 22, Client A 11 sends the SDP offer 14, which includes both SCReAM and TMMBR. It is here assumed that Client A supports both SCReAM ("a=rtcp-fb:* cc scream") and TMMBR ("a=rtcp-fb:*ccm tmmbr"). An example of such an SDP offer is given in Table 1 below. Important SDP attributes are highlighted in bold font.

TABLE 1

| SDP offer |
|---|
| m=audio 49152 RTP/AVP 97 98 |
| a=rtpmap:97 AMR-WB/16000/1 |
| a=fmtp:97 mode-change-capability=2; max-red=220 |
| a=rtpmap:98 AMR/8000/1 |
| a=fmtp:98 mode-change-capability=2; max-red=220 |
| a=ptime:20 |
| a=maxptime:240 |
| m=video 49154 RTP/AVPF 97 98 |
| a=rtpmap:97 H265/90000 |
| a=fmtp:97 profile-id=1; level-id=93; \ |
|     sprop-vps=QAEMAf//AWAAAAMAgAAAAwAAAwBaLAUg; \ |
|     sprop-sps=QgEBAWAAAAMAgAAAAwAAAwBaoAaiAeFlLktIvQB3CAQQ; \ |
|     sprop-pps=RAHAcYDZIA== |
| a=rtpmap:98 H264/90000 |
| a=fmtp:98 packetization-mode=0; profile-level-id=42e01f; \ |
|     sprop-parameter-sets=Z0KAHpWgNQ9oB/U=,aM46gA== |
| a=rtcp-fb:* trr-int 5000 |
| a=rtcp-fb:* nack |
| a=rtcp-fb:* nack pli |
| a=rtcp-fb:* ccm fir |
| a=rtcp-fb:* ccm tmmbr |
| a=rtcp-fb:* cc scream |

The example SDP offer shown above also describes that multiple codecs and configurations can be used for audio and video. For audio, both AMR and AMR-WB can be used. For video, both H.264 and H.265 can be used. It is quite normal in the SDP offer-answer that the SDP offer shows all possibilities supported by the originating client since it does not know which codecs or configurations the remote client supports.

At step 23, Client B 12 receives the SDP offer and determines, depending on its own capabilities, whether to allow both SCReAM and TMMBR in the session. If Client B supports both SCReAM and TMMBR, Client B accepts using both and sends the SDP answer 15 back to the originating Client A showing that both are accepted. This means that both methods are "negotiated" for the session. If Client B only supports TMMBR, then it cannot accept SCReAM and removes this option. In this case, Client B sends the SDP answer back to Client A showing that TMMBR is accepted. If Client B supports neither SCReAM nor TMMBR, then it removes both these options and sends the SDP answer without either of these alternatives.

An example SDP answer 15 is shown in Table 2 below, where Client B 12 has accepted both SCReAM and TMMBR. In addition, the SDP answer also shows that the terminating client has chosen to use AMR-WB for audio and H.264 for video. Important SDP attributes are highlighted in bold font.

TABLE 2

SDP answer m=audio 49152 RTP/AVP 97
a=rtpmap:97 AMR-WB/16000/1
a=fmtp:97 mode-change-capability=2; max-red=220
a=ptime:20
a=maxptime:240
m=video 49154 RTP/AVPF 98
a=rtpmap:98 H264/90000
a=fmtp:98 packetization-mode=0; profile-level-id=42e01f; \
   sprop-parameter-sets=Z0KAHpWgNQ9oB/U=,aM46gA==
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* cc scream After concluding the session setup negotiation at step 24, the media handling in the client is configured at step 25 depending on the outcome of the negotiation. Details of the configuring are shown in steps 25a-25e. At step 25a, it is determined whether the session setup negotiation concluded that both SCReAM and TMMBR are supported for the session. If so, the method moves to step 25b where the media handling in the client is configured to use SCReAM for dynamic rate adaptation and to use TMMBR only for semi-static rate adaptation. However, if it is determined at step 25a that the session setup concluded that both SCReAM and TMMBR are not supported for the session, the method moves to step 25c where it is determined whether SCReAM is not supported but TMMBR is supported for the session. If so, the method moves to step 25d where the media handling is configured to use TMMBR for both dynamic and semi-static rate adaptation. If is determined at step 25c that neither SCReAM nor TMMBR is supported for the session (which should be quite unusual for video since TMMBR is very widely supported for video telephony), the method moves instead to step 25e where the clients use RTCP Sender Reports (SR) and Receiver Reports (RR) for the rate adaptation. This fall-back to using RTCP SR/RR is well-known and is therefore not discussed further herein. The method then moves to step 26 where the media stream starts.

In this embodiment, both clients know which method for rate adaptation is supported by the remote client. Client A 11 can configure the media handling after it has received the SDP answer 15. Client B 12 can configure the media handling already when sending the SDP answer. Since it takes some time to send the SDP between the clients, the different clients do the configuration asynchronously.

Some of the steps described above can be performed in an alternative order. For example, the configuration step could be performed during the session negotiation phase, which can happen in case the negotiation requires multiple SDP offer-answer negotiation steps. The order in which the steps in the configuration phase are done may also be altered. It can also happen that one client does its media configuration after the session setup is completed while the other client does the its media configuration during the negotiation phase.

This method is not limited to only the session setup phase. It can also be performed during an on-going session, when a session is re-negotiated. This can happen, for example, when a session starts as voice-only and then video is added during the session. This can also happen if either user forwards the session to a third party, or if a 2-party call is changed into a 3-party call, where the third user may have different capabilities than the first two participants.

Figure 2B:
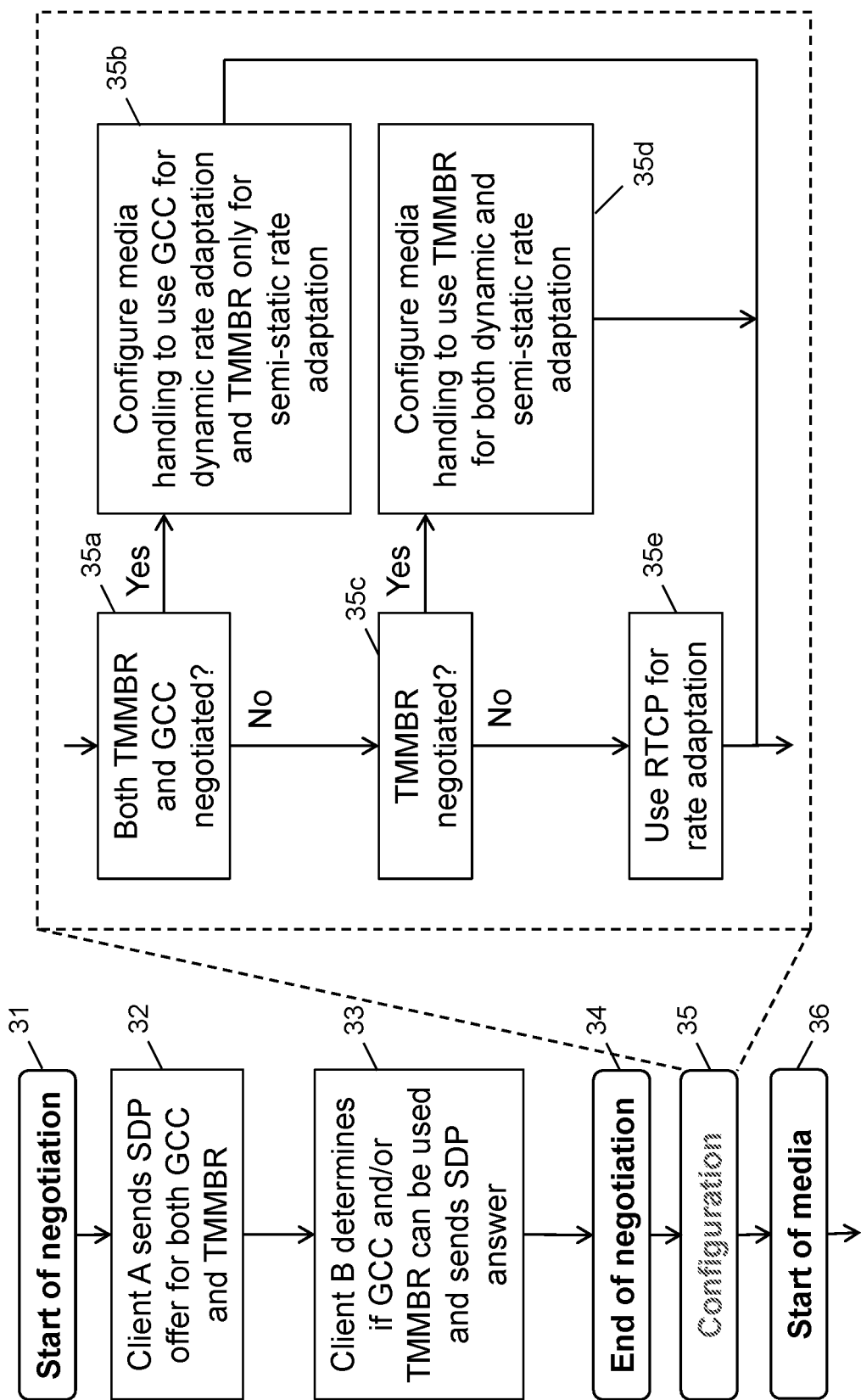
FIG. 2B is a computer flow diagram illustrating a method of negotiation and client configuration for congestion control utilizing GCC according to another embodiment of the present disclosure.

FIG. 2B is a computer flow diagram illustrating a method of negotiation and client configuration for GCC congestion control according to an embodiment of the present disclosure. Negotiation starts at step 31. At step 32, Client A 11 sends the SDP offer 14, which includes both GCC and TMMBR, to Client B 12. It is here assumed that Client A supports both GCC and TMMBR. At step 33, Client B receives the SDP offer and determines, depending on its own capabilities, whether to allow both GCC and TMMBR in the session. If Client B supports both GCC and TMMBR, Client B accepts using both and sends the SDP answer 15 back to the originating Client A showing that both are accepted. This means that both methods are "negotiated" for the session. If Client B only supports TMMBR, then it cannot accept GCC and removes this option. In this case, Client B sends the SDP answer back to Client A showing that TMMBR is accepted. If Client B supports neither GCC nor TMMBR, then it removes both these options and sends the SDP answer without either of these alternatives.

After concluding the session setup negotiation at step 34, the media handling in the client is configured at step 35 depending on the outcome of the negotiation. Details of the configuring are shown in steps 35a-35e. At step 35a, it is determined whether the session setup negotiation concluded that both GCC and TMMBR are supported for the session. If so, the method moves to step 35b where the media handling in the client is configured to use GCC for dynamic rate adaptation and to use TMMBR only for semi-static rate adaptation. However, if it is determined at step 35a that the session setup concluded that both GCC and TMMBR are not supported for the session, the method moves to step 35c where it is determined whether GCC is not supported but TMMBR is supported for the session. If so, the method moves to step 35d where the media handling is configured to use TMMBR for both dynamic and semi-static rate adaptation. If is determined at step 35c that neither GCC nor TMMBR is supported for the session, the method moves instead to step 35e where the clients use RTCP Sender Reports (SR) and Receiver Reports (RR) for the rate adaptation. This fall-back to using RTCP SR/RR is well-known and is therefore not discussed further herein. The method then moves to step 36 where the media stream starts.

FIG. 2C is a computer flow diagram illustrating a method of negotiation and client configuration for NADA congestion control according to an embodiment of the present disclosure. Negotiation starts at step 41. At step 42, Client A 11 sends the SDP offer 14, which includes both NADA and TMMBR, to Client B 12. It is here assumed that Client A supports both NADA and TMMBR. At step 43, Client B receives the SDP offer and determines, depending on its own capabilities, whether to allow both NADA and TMMBR in the session. If Client B supports both NADA and TMMBR, Client B accepts using both and sends the SDP answer 15 back to the originating Client A showing that both are accepted. This means that both methods are "negotiated" for the session. If Client B only supports TMMBR, then it cannot accept NADA and removes this option. In this case, Client B sends the SDP answer back to Client A showing that TMMBR is accepted. If Client B supports neither NADA nor TMMBR, then it removes both these options and sends the SDP answer without either of these alternatives.

After concluding the session setup negotiation at step 44, the media handling in the client is configured at step 45 depending on the outcome of the negotiation. Details of the configuring are shown in steps 45a-45e. At step 45a, it is determined whether the session setup negotiation concluded that both NADA and TMMBR are supported for the session. If so, the method moves to step 45b where the media handling in the client is configured to use NADA for dynamic rate adaptation and to use TMMBR only for semi-static rate adaptation. However, if it is determined at step 45a that the session setup concluded that both NADA and TMMBR are not supported for the session, the method moves to step 45c where it is determined whether NADA is not supported but TMMBR is supported for the session. If so, the method moves to step 45d where the media handling is configured to use TMMBR for both dynamic and semi-static rate adaptation. If is determined at step 45c that neither NADA nor TMMBR is supported for the session, the method moves instead to step 45e where the clients use RTCP Sender Reports (SR) and Receiver Reports (RR) for the rate adaptation. This fall-back to using RTCP SR/RR is well-known and is therefore not discussed further herein. The method then moves to step 46 where the media stream starts.

Negotiation and Client Configuration for Generic Feedback Format

Figure 2D:
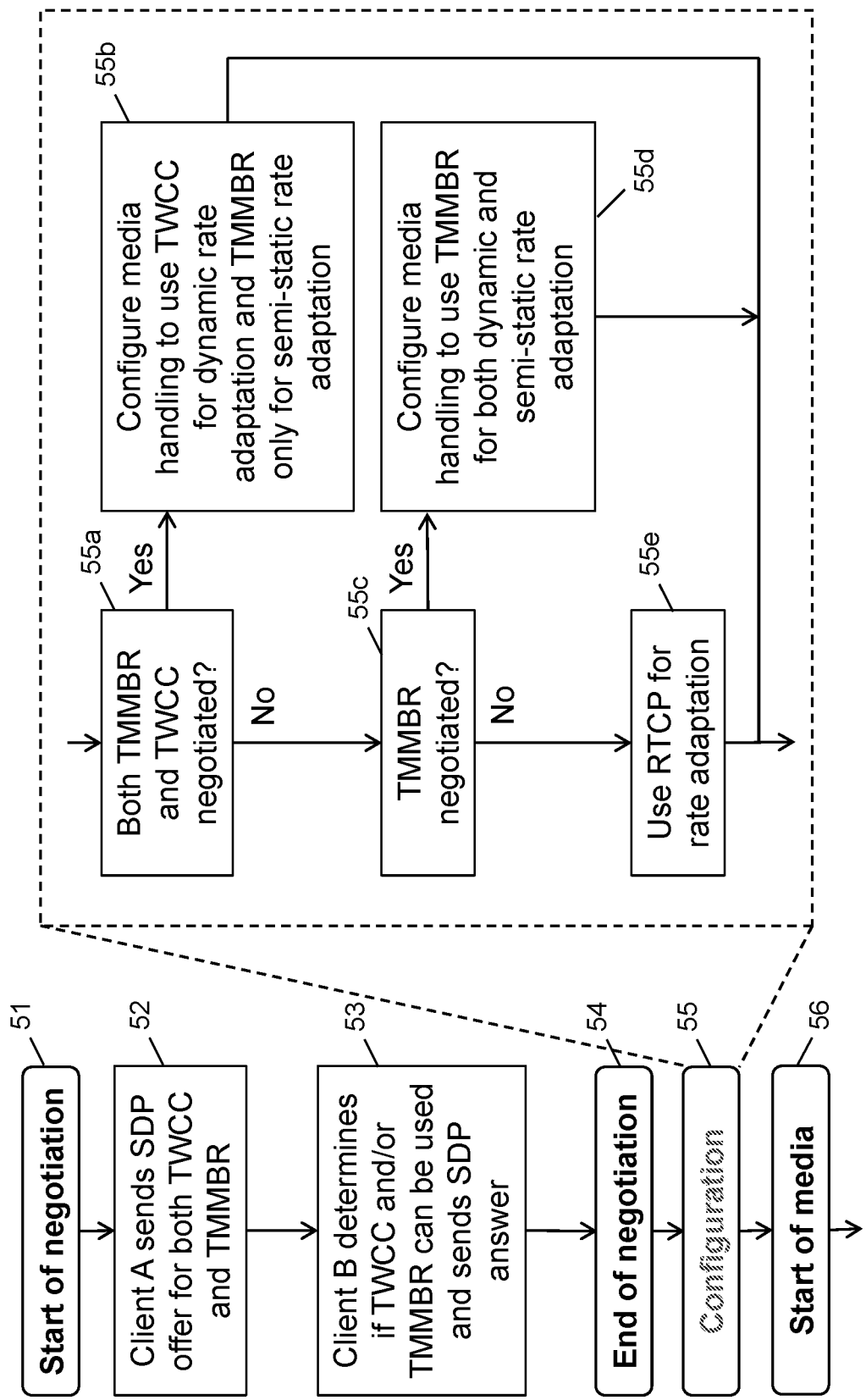
FIG. 2D is a computer flow diagram illustrating a method of negotiation and client configuration for congestion control utilizing TWCC according to an embodiment of the present disclosure.

FIG. 2D is a computer flow diagram illustrating a method of negotiation and client configuration for a generic feedback format such as TWCC according to an embodiment of the present disclosure. Negotiation starts at step 51. At step 52, Client A 11 sends the SDP offer 14, which includes both TWCC ("a=rtcp-fb:* cc-sig twcc") and TMMBR ("a=rtcp-fb:* ccm tmmbr"), to Client B 12. The SDP offer may also show that it is suggested to use a feedback signaling interval of 50 ms, ("a=rtcp-fb:* cc-sig fb-int 50"). It is here assumed that Client A supports a method for congestion control other than TMMBR although the exact method is not negotiated. An example of such an SDP offer is given in Table 3 below. Important SDP attributes are highlighted in bold font.

TABLE 3

| SDP offer |
|---|
| m=audio 49152 RTP/AVP 97 98 |
| a=rtpmap:97 AMR-WB/16000/1 |
| a=fmtp:97 mode-change-capability=2; max-red=220 |
| a=rtpmap:98 AMR/8000/1 |
| a=fmtp:98 mode-change-capability=2; max-red=220 |
| a=ptime:20 |
| a=maxptime:240 |
| m=video 49154 RTP/AVPF 97 98 |
| a=rtpmap:97 H265/90000 |
| a=fmtp:97 profile-id=1; level-id=93; \ |
|     sprop-vps=QAEMAf//AWAAAAMAgAAAAwAAAwBaLAUg; \ |
|     sprop-sps=QgEBAWAAAAMAgAAAAwAAAwBaoAaiAeFlLktIvQB3CAQQ; \ |
|     sprop-pps=RAHAcYDZIA== |
| a=rtpmap:98 H264/90000 |
| a=fmtp:98 packetization-mode=0; profile-level-id=42e01f; \ |
|     sprop-parameter-sets=Z0KAHpWgNQ9oB/U=,aM46gA== |
| a=rtcp-fb:* trr-int 5000 |
| a=rtcp-fb:* nack |
| a=rtcp-fb:* nack pli |
| a=rtcp-fb:* ccm fir |
| a=rtcp-fb:* ccm tmmbr |
| **a=rtcp-fb:* cc-sig twcc** |
| **a=rtcp-fb:* cc-sig fb-int 50** |

The example SDP offer shown above also describes that multiple codecs and configurations can be used for audio and video. For audio, both AMR and AMR-WB can be used. For video, both H.264 and H.265 can be used. It is quite normal in SDP offer-answer that the SDP offer shows all possibilities supported by the originating client since it does not know which codecs or configurations the remote client supports.

At step 53, Client B receives the SDP offer and determines, depending on its own capabilities, whether to allow both TMMBR and an alternative congestion control method (e.g., TWCC) in the session. If Client B supports both TWCC and TMMBR, Client B accepts using both and sends the SDP answer 15 back to the originating Client A showing that both are accepted. This means that both methods are "negotiated" for the session. The interval for the feedback also needs to be negotiated. If Client B only supports TMMBR, then it cannot accept TWCC and removes this option. In this case, Client B sends the SDP answer back to Client A showing that TMMBR is accepted. If Client B supports neither TWCC nor TMMBR, then it removes both these options and sends the SDP answer without either of these alternatives.

An example SDP answer is shown in Table 4 below where Client B has accepted both TWCC and TMMBR. In addition, the SDP answer shows also that the terminating client has chosen to use AMR-WB for audio and H.264 for video. Important SDP attributes are highlighted in bold font.

TABLE 4

SDP answer

```
m=audio 49152 RTP/AVP 97
a=rtpmap:97 AMR-WB/16000/1
a=fmtp:97 mode-change-capability=2; max-red=220
a=ptime:20
a=maxptime:240
m=video 49154 RTP/AVPF 98
a=rtpmap:98 H264/90000
a=fmtp:98 packetization-mode=0; profile-level-id=42e01f; \
    sprop-parameter-sets=Z0KAHpWgNQ9oB/U=,aM46gA==
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* cc-sig twcc
a=rtcp-fb:* cc-sig fb-int 50
```

After concluding the session setup negotiation at step 54, the media handling in the client is configured at step 55 depending on the outcome of the negotiation. Details of the configuring are shown in steps 55a-55e. At step 55a, it is determined whether the session setup negotiation concluded that both TWCC and TMMBR are supported for the session. If so, the method moves to step 55b where the media handling in the client is configured to use an alternative congestion control method (SCReAM, GCC, NADA, or something else) for dynamic rate adaptation and to use TMMBR only for semi-static rate adaptation. Furthermore, the TWCC generic feedback format is used for signaling congestion control related information between the clients.

However, if it is determined at step 55a that the session setup concluded that both TWCC and TMMBR are not supported for the session, the method moves to step 55c where it is determined whether TWCC is not supported but TMMBR is supported for the session. If so, the method moves to step 55d where the media handling is configured to use TMMBR for both dynamic and semi-static rate adaptation. If is determined at step 55c that neither TWCC nor TMMBR is supported for the session, the method moves instead to step 55e where the clients use RTCP Sender Reports (SR) and Receiver Reports (RR) for the rate adaptation. This fall-back to using RTCP SR/RR is well-known and is therefore not discussed further herein. The method then moves to step 56 where the media stream starts.

In this embodiment, neither client knows which method for rate adaptation the remote client supports. This is also not needed since the generic feedback format is used for interworking between different methods.

It should be clear that the negotiation of what feedback signaling to use, including the interval, can be done in different ways, for example using other names and also negotiating both the name of the feedback signaling and the interval on the same attribute line. An alternative to negotiating the feedback interval is to negotiate the feedback frequency, e.g. how many feedback messages should be sent per second.

Fall-Back to TMMBR

When the answering client receives an SDP offer including both SCReAM/GCC/NADA/TWCC and TMMBR it has to compare the received SDP offer with its own capabilities. If the answering client does not support SCReAM/GCC/NADA/TWCC then it has to reject any/all attribute lines offering to use these congestion control methods.

Table 5 shows an example SDP answer where the answering client has accepted using both audio and video for the session, AMR-WB is selected for audio, and H.264 is selected for video. However, the answerer agrees on using only TMMBR.

TABLE 5

SDP answer

```
m=audio 49152 RTP/AVP 97
a=rtpmap:97 AMR-WB/16000/1
a=fmtp:97 mode-change-capability=2; max-red=220
a=ptime:20
a=maxptime:240
m=video 49154 RTP/AVPF 98
a=rtpmap:98 H264/90000
a=fmtp:98 packetization-mode=0; profile-level-id=42e01f; \
    sprop-parameter-sets=Z0KAHpWgNQ9oB/U=,aM46gA==
a=rtcp-fb:* trr-int 5000
a=rtcp-fb:* nack
a=rtcp-fb:* nack pli
a=rtcp-fb:* ccm fir
a=rtcp-fb:* ccm tmmbr
```

In this case, since only TMMBR is negotiated, the originating client configures the rate adaptation to use TMMBR for both dynamic rate adaptation and for semi-static rate adaptation. In this case, Client A does not know if Client B will use TMMBR for dynamic rate adaptation or only for semi-static rate adaptation. However, regardless of what Client B intends to do, Client A supports both variants. Client A can also send adaptation requests for dynamic rate adaptation because Client B has declared that it supports receiving TMMBR messages and it should then adapt the rate based on the requests that Client A sends.

Alternative embodiments of the present disclosure may include additional steps responsible for providing additional functionality, but such additional steps and/or functionality may not be germane to the description and are omitted for the sake of clarity.

It should also be noted that although FIGS. 2A-2D show that the negotiation and configuration follow a certain sequence, it is possible to do these steps in alternative ways. For example, the negotiation and the configuration may be performed simultaneously because the negotiation may include multiple offer/answer exchanges. The first offer/answer exchange may be a "provisional negotiation", which selects the codecs, configuration, and congestion control methods to be used in the session. This first offer/answer exchange may be completed before the answering user has answered the call. A second offer/answer may be needed to verify other setup criteria such as, for example, radio resources allocation has been successful. A third offer/answer may even be required when the answering user accepts the call. Thus, the configuration can already be done after the first offer/answer, even though the negotiation continues with one or more additional offer/answer exchanges.

Another alternative may occur when Client A supports several congestion control methods, for example both SCReAM and GCC, but prefers to use one of them, for example SCReAM, over the other. In this case, the first offer would likely include only TMMBR and SCReAM. If Client B does not support SCReAM, Client B will reject SCReAM and (likely) accept just TMMBR. The clients would then be configured to use only TMMBR. However, Client A may send a new SDP offer to try to negotiate GCC (in addition to TMMBR). If Client B supports GCC, Client B may accept this, and then the clients would be re-configured to use GCC (in addition to TMMBR). This is thus an iterative sequence where only TMMBR is negotiated at first, and the clients are configured accordingly, but another congestion control method is negotiated in a later iteration, and the clients are then re-configured with this.

Figure 3:
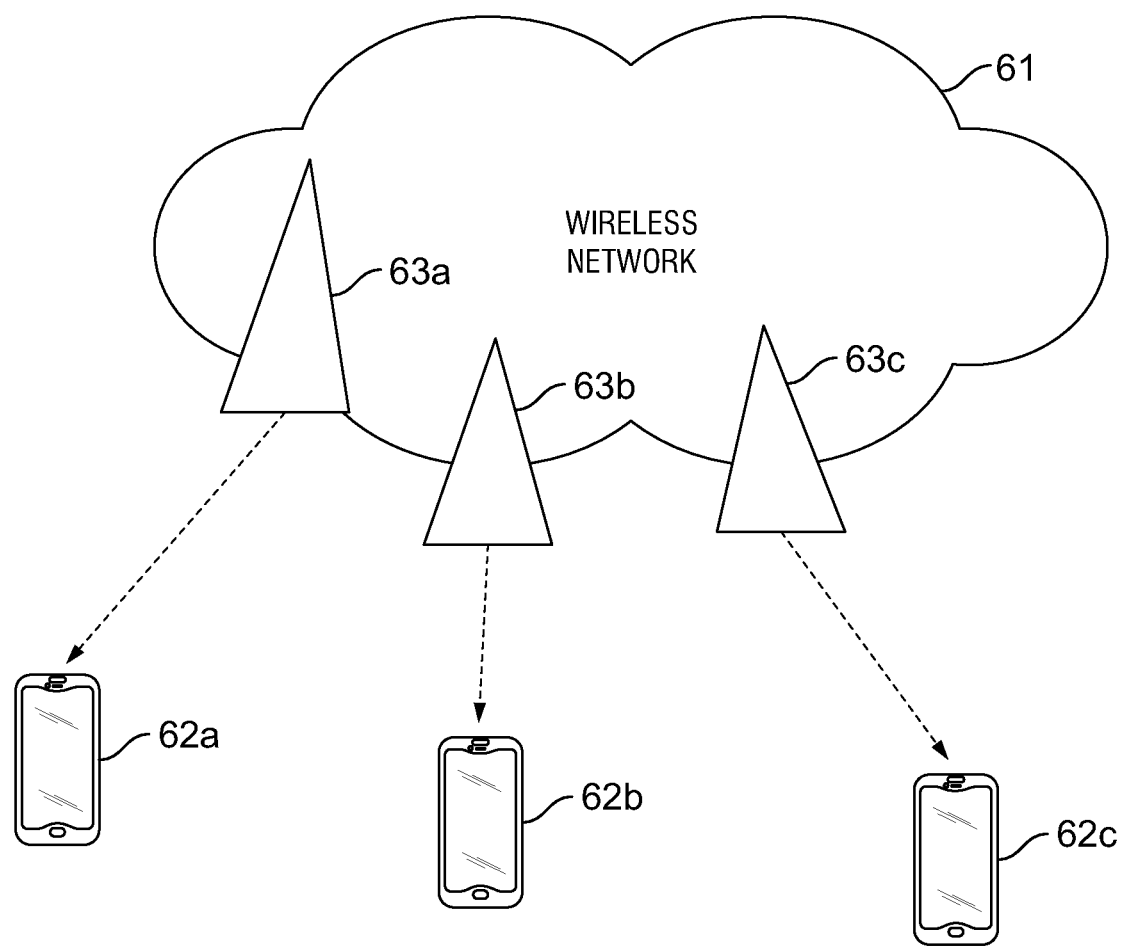
FIG. 3 is a high-level block diagram of an example communication system in accordance with an embodiment of the present disclosure.

FIG. 3 is a high-level block diagram of an example communication system in accordance with an embodiment of the present disclosure. Although the described solutions may be implemented in any appropriate type of telecommunications system supporting any suitable communication standards using any suitable components, particular embodiments of the described solutions may be implemented in a wireless communication network 61. The example network may include one or more instances of User Equipments (UEs) 62*a-c* and one or more base stations 63*a-c* capable of communicating with the UEs or between a UE and another communication device (such as a landline telephone). Although the illustrated UEs may represent communication devices that include any suitable combination of hardware and software, these UEs may, in particular embodiments, represent devices such as the example UE illustrated in greater detail in FIG. 4. Similarly, although the illustrated base stations may represent network nodes that include any suitable combination of hardware and/or software, these base stations may, in particular embodiments, represent devices such as the example base station illustrated in greater detail by FIG. 5.

Figure 4:
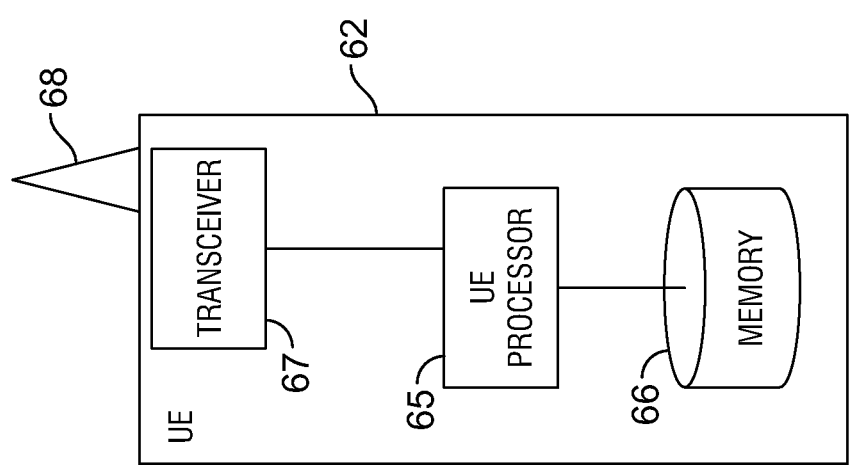
FIG. 4 is a simplified block diagram of an example user equipment (UE) in accordance with an embodiment of the present disclosure.

FIG. 4 is a simplified block diagram of an example User Equipment (UE) 62 in accordance with an embodiment of the present disclosure. The example UE includes a UE processor 65, a memory 66, a transceiver 67, and an antenna 68. In particular embodiments, some or all of the functionality described above as being provided by mobile communication devices or other forms of UE may be provided by the UE processor 65 executing instructions stored on a computer-readable medium, such as the memory 66 shown in FIG. 4. Alternative embodiments of the UE may include additional components beyond those shown in FIG. 4 that may be responsible for providing certain aspects of the UE's functionality, including any of the functionality described above and/or any functionality necessary to support the solution described above.

Figure 5:
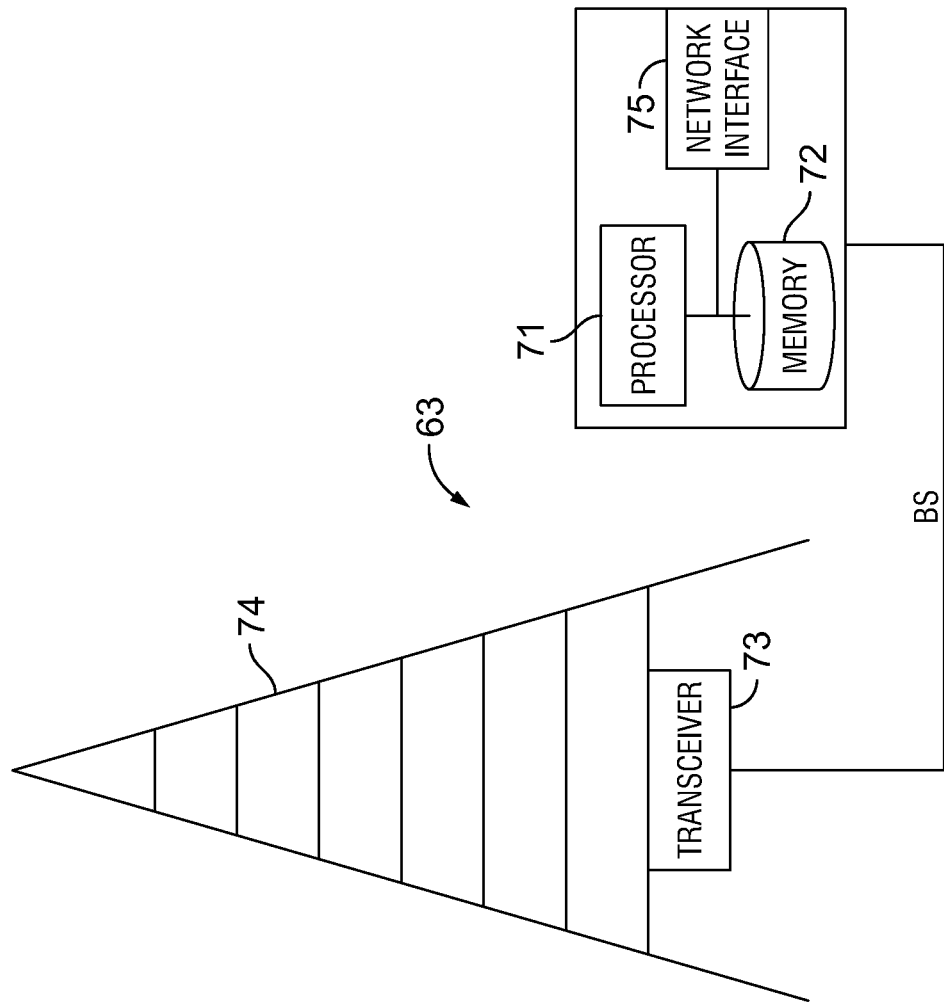
FIG. 5 is a simplified block diagram of an example base station in accordance with an embodiment of the present disclosure.

FIG. 5 is a simplified block diagram of an example Base Station (BS) 63 in accordance with an embodiment of the present disclosure. The example base station includes a BS processor 71, a memory 72, a transceiver 73, an antenna 74, and a network interface 75. In particular embodiments, some or all of the functionality described above as being provided by a mobile base station, a base station controller, a node B, an enhanced node B, and/or any other type of mobile communications node may be provided by the base station processor 71 executing instructions stored on a computer-readable medium, such as the memory 72 shown in FIG. 5. Alternative embodiments of the base station may include additional components responsible for providing additional functionality, including any of the functionality identified above and/or any functionality necessary to support the solution described above.

Figure 6:
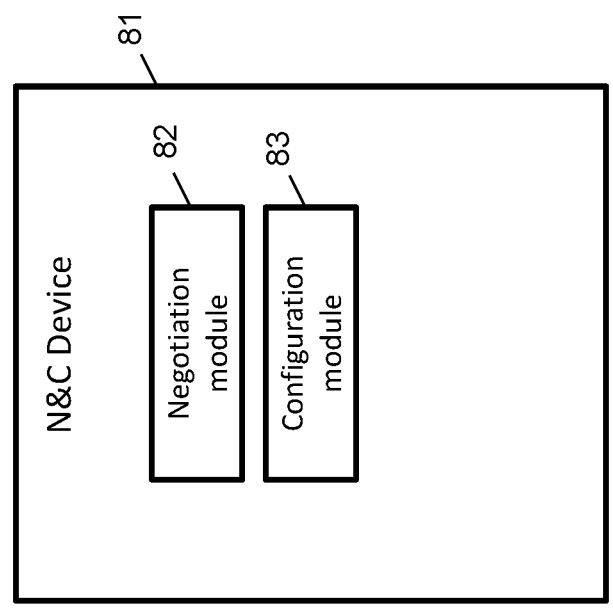
FIG. 6 is a simplified schematic block diagram of a Negotiation and Configuration (N&C) apparatus with functional modules.

FIG. 6 is a simplified schematic block diagram of a Negotiation and Configuration (N&C) apparatus 81 with functional modules. The apparatus includes a negotiation module 82 and a configuration module 83. The negotiation module 82 performs session setup negotiation as described above and shown in FIG. 2A steps 21-24, FIG. 2B steps 31-34, FIG. 2C steps 41-44, and FIG. 2D steps 51-54. The configuration module 83 configures a client regarding rate adaptation for congestion control based on the outcome of the session setup negotiation, as shown in FIG. 2A steps 25*a*-25*e*, FIG. 2B steps 35*a*-35*e*, FIG. 2C steps 45*a*-45*e*, and FIG. 2D steps 55*a*-55*e*. In at least one embodiment, the negotiation module 82 and the configuration module 83 include a memory and a processor, and are implemented as a computer program running on the processor. Examples include UE processor 65 and memory 66 of FIG. 4, and processor 71 and memory 72 of FIG. 5.

The negotiation and configuration apparatus 81 may be implemented in, for example, a UE, such as UE 62 described in conjunction with FIG. 4 and/or clients, such as those described in conjunction with FIG. 1, and/or in a network or network node, such as described in conjunction with FIG. 1, 3, or 5.

In the drawings and specification, there have been disclosed typical preferred embodiments of the disclosure and, although specific terms are employed, they are used in a generic and descriptive sense only and not for purposes of limitation, the scope of the invention being set forth in the following claims.

What is claimed is:

1. A method of configuring a first client device to utilize at least one type of rate adaptation method in a negotiated session with a second client device, the method comprising:
while negotiating the negotiated session with the second client device, determining whether a first type of rate adaptation method usable for both semi-static rate adaptation and dynamic rate adaptation, a generic feedback format, or both the first type of rate adaptation method and the generic feedback format are to be used in the negotiated session;
upon determining that only the first type of rate adaptation method is to be used in the negotiated session, configuring the first client device to utilize the first type of rate adaptation method for both semi-static rate adaptation and for dynamic rate adaptation in the negotiated session; and
upon determining that both the first type of rate adaptation method and the generic feedback format are to be used in the negotiated session, configuring the first client device to utilize the first type of rate adaptation method for semi-static rate adaptation in the negotiated session, and to utilize for dynamic rate adaptation in the negotiated session a preferred rate adaptation method selected from a plurality of rate adaptation method types that provide improved performance for dynamic rate adaptation compared to the first type of rate adaptation method.

2. The method according to claim 1, wherein the first type of rate adaptation method is Temporary Maximum Media Stream Bit Rate (TMMBR), and the generic feedback format is Transport-Wide Congestion Control (TWCC).

3. The method according to claim 2, wherein when both TMMBR and TWCC are negotiated for the session, the step of configuring the first client device to utilize a preferred type of rate adaptation method for dynamic rate adaptation includes configuring the first client device to utilize one of:
Self-Clocked Rate Adaptation for Multimedia (SCReAM);
Google Congestion Control (GCC); and
Network-Assisted Dynamic Adaptation (NADA).

4. The method according to claim 1, wherein the step of configuring the first client device to utilize a preferred type of rate adaptation method for dynamic rate adaptation includes:
configuring the first client device to utilize a first preferred rate adaptation method preferred by the first client device, wherein the first preferred rate adaptation method is different from a second preferred rate adaptation method preferred by the second client device.

5. The method according to claim 1, further comprising: upon determining that neither the first type of rate adaptation method nor the generic feedback format are to be used in the session, configuring the first client device to utilize Real-time Transport Protocol Control Protocol (RTCP) Sender Reports (SR) and Receiver Reports (RR) as a fallback for rate adaptation.

6. An apparatus in a first client device for configuring the first client device to utilize at least one type of rate adaptation method in a negotiated session with a second client device, the apparatus comprising:

a processor; and a non-transitory memory for storing instructions executable by the processor, the instructions including session-establishment instructions and device-configuration instructions;

wherein, when the first client device initiates establishment of the negotiated session with the second client device, the processor is configured to execute the instructions in the memory, thereby causing the processor to:

while negotiating the negotiated session with the second client device, determine whether a first type of rate adaptation method usable for both semi-static rate adaptation and dynamic rate adaptation, a generic feedback format, or both the first type of rate adaptation method and the generic feedback format are to be used in the negotiated session;

upon determining that only the first type of rate adaptation method is to be used in the negotiated session, configure the first client device to utilize the first type of rate adaptation method for both semi-static rate adaptation and for dynamic rate adaptation in the negotiated session; and upon determining that both the first type of rate adaptation method and the generic feedback format are to be used in the negotiated session, configure the first client device to utilize the first type of rate adaptation method for semi-static rate adaptation in the negotiated session, and to utilize for dynamic rate adaptation in the negotiated session a preferred type of rate adaptation method selected from a plurality of rate adaptation method types that provide improved performance for dynamic rate adaptation compared to the first type of rate adaptation method.

7. The apparatus according to claim 6, wherein the first rate adaptation method is Temporary Maximum Media Stream Bit Rate (TMMBR), and the generic feedback format is Transport-Wide Congestion Control (TWCC).

8. The apparatus according to claim 7, wherein when both TMMBR and TWCC are negotiated for the session, the processor is caused to configure the first client device to utilize one of:

Self-Clocked Rate Adaptation for Multimedia (SCReAM);

Google Congestion Control (GCC); and

Network-Assisted Dynamic Adaptation (NADA).

9. The apparatus according to claim 6, wherein the processor is caused to configure the first client device to utilize a preferred rate adaptation method for dynamic rate adaptation by:

configuring the first client device to utilize a first preferred rate adaptation method preferred by the originating client device, wherein the second client device utilizes a different, second preferred rate adaptation method.

10. The apparatus according to claim 6, wherein, when neither the first rate adaptation method nor the generic feedback format are to be used in the session, the processor is further caused to configure the first client device to utilize Real-time Transport Protocol Control Protocol (RTCP) Sender Reports (SR) and Receiver Reports (RR) for rate adaptation.

* * * * *